(12) United States Patent
Kwak (10) Patent No.: US 8,620,515 B2
(45) Date of Patent: Dec. 31, 2013

(54) INTELLIGENT FLEET MANAGEMENT SYSTEM AND METHOD

(75) Inventor: Sung Bok Kwak, Milpitas, CA (US)

(73) Assignee: Hana Micron America, Inc., Milpitas, CA (US)

( * ) Notice: Subject to any disclaimer, the term of this patent is extended or adjusted under 35 U.S.C. 154(b) by 59 days.

(21) Appl. No.: 13/461,662

(22) Filed: May 1, 2012

(65) Prior Publication Data
US 2013/0297095 A1  Nov. 7, 2013

(51) Int. Cl.
*G01M 17/00*  (2006.01)

(52) U.S. Cl.
USPC ........................................ 701/29.3; 701/409

(58) Field of Classification Search
USPC ............ 701/1, 409, 412, 117, 208, 213, 29.3; 342/357.2; 340/988
See application file for complete search history.

(56) References Cited

U.S. PATENT DOCUMENTS

| | | | |
|---|---|---|---|
| 5,922,040 A * | 7/1999 | Prabhakaran ................. | 701/117 |
| 6,108,591 A * | 8/2000 | Segal et al. ........................ | 701/1 |
| 6,339,745 B1 * | 1/2002 | Novik ............................ | 701/431 |
| 6,892,131 B2 * | 5/2005 | Coffee et al. ................... | 701/482 |
| 7,808,371 B2 * | 10/2010 | Blanchet et al. ............. | 340/426.1 |
| 2006/0265117 A1 * | 11/2006 | Cahoon ........................... | 701/114 |
| 2010/0191412 A1 * | 7/2010 | Kim ................................ | 701/33 |
| 2013/0197776 A1 * | 8/2013 | Davidson et al. .............. | 701/101 |

* cited by examiner

*Primary Examiner* — Thomas Black
*Assistant Examiner* — Shardul Patel
(74) *Attorney, Agent, or Firm* — Samuel S. Cho; Invent Capture, LLC.

(57) ABSTRACT

An intelligent fleet management system and a related method of operation provide a higher level of legal compliance and public road safety by requiring a commercial driver an electronic form of a driver's identification in a commercial vehicle. In one embodiment of the invention, the electronic form of the driver's identification is validated and additionally authenticated by a driver-specific PIN entry to a vehicle fleet management system interface device installed in a commercial vehicle. The vehicle fleet management system interface device can also communicate with a monitoring station via a data network for dynamically-generated alerts and periodic reports associated with vehicle speeds, driving pattern analysis utilizing various sensors, unexpected stops, and continuous driving which exceed a mandatory rest requirement. The monitoring station is able to disable the commercial vehicle remotely or take other actions based on an alert generated from the vehicle fleet management system interface device.

17 Claims, 7 Drawing Sheets

An Embodiment of an Intelligent Fleet Management System

An Embodiment of an Intelligent Fleet Management System

A First Embodiment of a Vehicle Fleet Management System Interface Device

A Second Embodiment of a Vehicle Fleet Management System Interface Device

A System Block Diagram Example for a Vehicle Fleet Management System Interface Device

INTELLIGENT FLEET MANAGEMENT SYSTEM AND METHOD

BACKGROUND OF THE INVENTION

The present invention generally relates to vehicle and public transit information management methods and systems. More specifically, various embodiments of the present invention relate to intelligent commercial and public transit management systems and methods.

Commercial transport and public transit drivers carry significant social and public responsibilities for the safety of their passengers, cargo, and others who share local road and highways. In some municipalities, states, and countries, the authenticity of a government-certified commercial driver is frequently in question because an uncertified driver often illegally substitutes for the government-certified commercial driver. For example, in certain countries, tragic traffic accidents have routinely occurred when uncertified drivers who are unable to handle complex traffic situations in long distance travel illegally drove commercial vehicles with a falsified driver's license or another form of identification. While increased penalties for illegal driving of commercial vehicles or other conventional regulatory measures, in theory, deter uncertified drivers from operating commercial vehicles, many conventional deterrence measures against uncertified drivers have been ineffective in some countries, states, and municipalities.

Furthermore, even when legitimate commercial transport and public transit drivers are driving commercial vehicles, a dangerous level of driver tiredness and/or attention deficit increase the probability of a traffic accident. Because buses, trucks, and other commercial vehicles are typically heavy and carry a large number of passengers and/or cargo, the consequence of a traffic accident caused by a tired or inattentive commercial driver may be more severe than other types of traffic accidents. Certain countries, states, and/or municipalities have required a commercial transport and public transit driver to take a mandatory rest from continuous driving. For example, Chile requires a commercial bus driver to take a mandatory one-hour rest after five hours of continuous driving, or a mandatory eight-hour rest after eight hours of continuous driving. In another example, Indonesia requires a mandatory thirty-minute rest after four hours of continuous driving, or a mandatory eight-hour rest after eight hours of driving. However, much of the regulatory measures for mandatory driver rest requirements, such as the examples drawn from Chile and Indonesia, are difficult to monitor and enforce with conventional commercial transport infrastructure.

Moreover, a lack of tamperproof identity validation of drivers in a commercial transport and public transit industry also exposes government agencies and transportation companies to an unacceptable level of liability lawsuits, especially when passengers are harmed in an accident involving an uncertified driver for a commercial vehicle. In addition, the lack of tamperproof identity validation of drivers in the commercial transport and public transit industry make criminal prosecution of certified drivers difficult when some certified drivers illegally lend their identification cards or other pertinent information to uncertified drivers for monetary gain.

Therefore, it may be desirable to devise an intelligent fleet management system and a related method which provide a convenient and tamperproof validation of commercial drivers' identification inside commercial vehicles. Furthermore, it may also be desirable to devise an intelligent fleet management system and a related method which can store, track, monitor, and report information related to commercial drivers' actions and behaviors. In addition, it may also be desirable to provide an intelligent fleet management system and a related method which can analyze driving patterns of a particular commercial vehicle and alert its driver and/or a monitoring center in real time, if a dangerous behavior is detected.

SUMMARY

Summary and Abstract summarize some aspects of the present invention. Simplifications or omissions may have been made to avoid obscuring the purpose of the Summary or the Abstract. These simplifications or omissions are not intended to limit the scope of the present invention.

In one embodiment of the invention, an intelligent fleet management system for a commercial vehicle is disclosed. This intelligent fleet management system comprises: a vehicle fleet management system interface device configured to validate an electronic form of a driver's identification by accessing the electronic form and also requiring a driver-specific personal identification number (PIN) entry into the vehicle fleet management system interface; an analytical software and/or hardware module at least partially executed on a CPU and a memory unit of the vehicle fleet management system interface device, wherein the analytical software and/or hardware module comprises a speed and driving pattern analysis module, an unexpected stop detection module, a driver's identification validation module, and a reporting module; a wireless transceiver unit and a global positioning system (GPS) receiver unit incorporated in the vehicle fleet management system interface device, wherein the wireless transceiver unit is configured to communicate data from the driver's identification validation module, the speed and driving pattern analysis module, the unexpected stop detection module, and/or other relevant data with a monitoring station; and the monitoring station configured to communicate with the vehicle fleet management system interface device via a wireless and/or wired data network.

In another embodiment of the invention, a method of operating an intelligent fleet management system is disclosed. This method comprises the steps of: inserting or enabling a driver's electronic identification to be accessed by a vehicle fleet management system interface device in a commercial vehicle; entering a correct personal identification number (PIN) into the vehicle fleet management system interface device using a keyboard, a keypad, or a touch screen; if the driver's electronic identification is validated: activating a driver pattern analysis module for speed and driving pattern analysis, unexpected stop detection, the driver's electronic identification presence check, and analysis reporting for a monitoring station; displaying a validated driver's name, a current speed of the commercial vehicle, and other relevant driving information; and transmitting periodic and dynamically-triggered alerts and reports from the vehicle fleet management system interface to the monitoring station; else if the driver's electronic identification is not validated: alerting the monitoring station for the vehicle fleet management system and/or disabling the commercial vehicle associated with the vehicle fleet management system interface device.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

The detailed description is presented largely in terms of description of shapes, configurations, and/or other symbolic representations that directly or indirectly resemble one or more intelligent fleet management systems and methods. These descriptions and representations are the means used by those experienced or skilled in the art to most effectively convey the substance of their work to others skilled in the art.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment. Furthermore, separate or alternative embodiments are not necessarily mutually exclusive of other embodiments. Moreover, the order of blocks in process flowcharts or diagrams representing one or more embodiments of the invention do not inherently indicate any particular order nor imply any limitations in the invention.

For the purpose of describing the invention, a term "fleet management" is defined as management and validation of commercial vehicles and their associated commercially-licensed drivers. Examples of "fleet management" include, but are not limited to, management of buses, trucks, taxis, limousines, other types of vehicles, and/or their associated drivers for transportation of passengers.

Furthermore, a term "intelligent fleet management system" refers to a networked electronic and data infrastructure and interface devices among commercial vehicles and at least one monitoring station for dynamic and/or real-time management of commercial vehicles and their associated commercially-licensed drivers.

In addition, for the purpose of describing the invention, a term "vehicle fleet management system interface" is defined as an electronic device configured to validate, track, monitor, and report information associated with a commercially-licensed driver or another individual attempting to drive a commercial vehicle. In a preferred embodiment of the invention, a vehicle fleet management system interface is installed in a commercial vehicle such as a bus or a truck. In one embodiment of the invention, the vehicle fleet management system interface is able to validate the identity of a driver by requiring a smart card reading and a personal identification number (PIN) by the vehicle fleet management system interface. Furthermore, in one embodiment of the invention, the vehicle fleet management system interface may also record, track, analyze, and report a driver's driving patterns and other behaviors for record-keeping and dynamic alert generation as an accident avoidance attempt.

Furthermore, for the purpose of describing the invention, a term "driver's driving pattern analysis" is defined detecting, monitoring, deducing, and/or determining a driver's driving behavior based on sensor readings and/or other input value readings. For example, in one embodiment of the invention, a driver's driving pattern analysis module executed on a CPU and a memory unit of a computer or another electronic device takes input readings such as a vehicle's speed, the magnitude of the vehicle's lane deviation, and the magnitude of the vehicle's lurching measured as acceleration.

In addition, for the purpose of describing the invention, a term "server" is defined as a physical computer, another hardware device, a software module, or a combination thereof, wherein the "server" is dedicated to executing one or more computer programs for receiving, processing, and/or monitoring data from a vehicle fleet management system interface. In one embodiment of the invention, a server is connected to one or more data networks, such as a local area network (LAN), a wide area network (WAN), a cellular network, and the Internet. In one embodiment of the invention, a server is used in a fleet monitoring station, wherein the fleet monitoring station gathers data from a plurality of vehicle fleet management system interfaces installed in a plurality of commercial vehicles.

One aspect of an embodiment of the present invention is providing an intelligent fleet management system that securely validates a commercial driver's identification with an identification information reader incorporated in a vehicle fleet management system interface device, which is installed in a commercial vehicle. In a preferred embodiment of the invention, the identification information reader is a smart card reader, and the commercial driver's identification is a smart card with a personal identification number (PIN) entry requirement for secure validation of the commercial driver's identity.

Another aspect of an embodiment of the present invention is providing an intelligent fleet management system that includes a monitoring station for commercial vehicles and a vehicle fleet management system interface device per vehicle, which is operatively connected to the monitoring station by an electronic data network such as a cellular network, a local are network, a wide area network, the Internet, or a combination thereof. In a preferred embodiment of the invention, the monitoring station is capable of receiving, tracking, and analyzing data transmitted from each vehicle fleet management system interface installed in a commercial vehicle.

Yet another aspect of an embodiment of the present invention is providing an intelligent fleet management system that alerts a monitoring station for commercial vehicles, if a particular commercial driver is exhibiting dangerous or problematic behavior. Examples of dangerous or problematic behaviors include, but are not limited to, exceeding a speed limit, increasing gas pedal-associated vehicle lurches and/or lane deviations, making unexpected stops during a journey, or not taking a mandatory rest after a long drive.

In addition, another aspect of an embodiment of the present invention is providing a method of operating an intelligent fleet management system that may include an electronic validation of a driver' identification, a driver's driving pattern and behavior monitoring, and other desirable features described in association with various system embodiments of the present invention.

Figure 1:
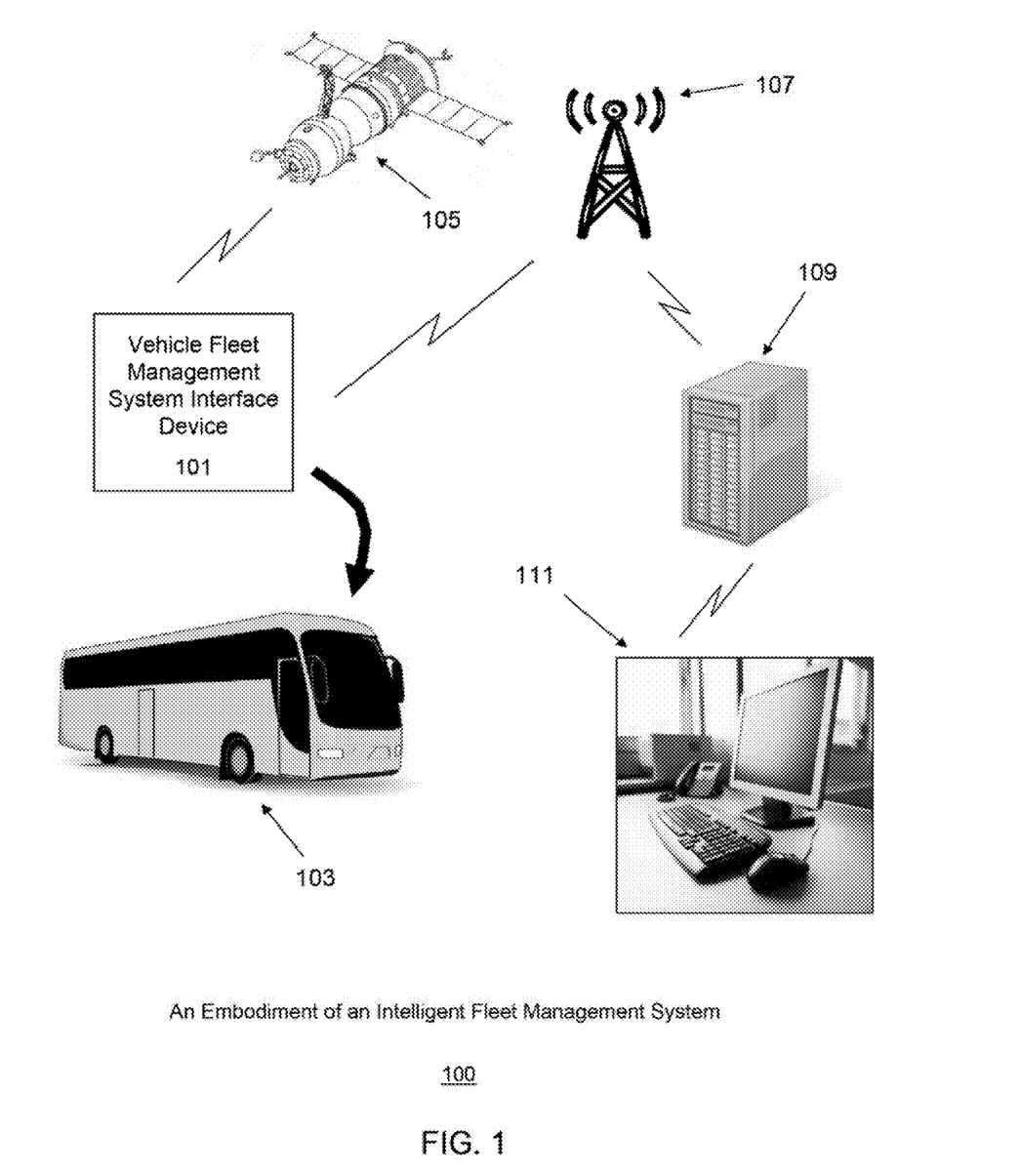
FIG. 1 shows an overall system diagram for an intelligent fleet management system in accordance with an embodiment of the invention.

FIG. 1 shows an overall system diagram for an intelligent fleet management system (100) in accordance with an embodiment of the invention. In a preferred embodiment of the invention, the intelligent fleet management system (100) comprises a vehicle fleet management system interface device (101) installed in a commercial vehicle (103), a computer server (109) and a monitoring station (111) which are configured to receive and process data transmitted from the vehicle fleet management system interface device (101), and a data network operatively connected to the vehicle fleet management system interface device (101) and the monitoring station (111), wherein the data network may include a cellular network (107), a satellite-based network (105), and/or another wireless or wired data network.

In the preferred embodiment of the invention, the vehicle fleet management system interface device (101) is capable of receiving global positioning system (GPS) satellite signals (i.e. 105), which can be recorded by a data storage in the vehicle fleet management system interface device (101) for real-time tracking of speed and location. Furthermore, in the preferred embodiment of the invention, the vehicle fleet management system interface device (101) is also capable of transmitting and receiving wireless data signals to the cellular network (107) and/or other data networks for communication with the computer server (109) and the monitoring station (111). The wireless data signals may utilize one or more of cellular network signal standards (e.g. GPRS, W-CDMA, HSDPA, LTE, CDMA2000, CDMA2000 EV-DO, and etc.), IEEE 802.16-derived "WiMax" signal standards, IEEE 802.11-derived Wi-Fi signal standards, or a combination thereof.

Continuing with FIG. 1, in a preferred embodiment of the invention, the vehicle fleet management system interface device (101) equipped with a smart card reader or another identification information reader, which can securely validate a commercial driver's identification. Furthermore, in the preferred embodiment of the invention, the smart card reader or another identification information reader associated with the vehicle fleet management system interface device (101) has a security feature which requires a personal identification number (PIN) entry for secure validation of the commercial driver's identity.

In one embodiment of the invention, if the PIN is entered incorrectly for a few times, the vehicle fleet management system interface device (101) can disable engine start for the commercial vehicle (103) and alert a potential security breach to the monitoring station (111), which is configured to receive the potential security breach alert from the vehicle fleet management system interface device (101) via a data network (e.g. 107). In this embodiment of the invention, a human operation controller at the monitoring station (111) or an automated computer program executed on the computer server (109) can further determine whether to enable the engine start for the commercial vehicle (103) or leave the engine disabled, based on specific circumstances which caused the potential security breach. For example, if an assigned and legitimate commercial driver mistakenly entered incorrect PIN several times to trigger an engine start disable mode, then the human operation controller at the monitoring station (111) or the automated computer program executed on the computer server (109) can simply reset the engine start disable mode for further PIN entry opportunities. On the other hand, if an illegitimate driver is attempting to drive the commercial vehicle (103) by using an invalid smart card and/or by entering incorrect PIN's, then the human operation controller at the monitoring station (111) or the automated computer program executed on the computer server (109) can maintain the engine start disable mode while a law enforcement agency is contacted for apprehension of the illegitimate driver and further situational control.

In another embodiment of the invention, if the PIN is entered incorrectly for a few times, instead of disabling the commercial vehicle's engine or its operation, the vehicle fleet management system interface device (101) stores details of invalid PIN entries in its data storage and transmit relevant information to the computer server (109) and the monitoring station (111) via a data network. The human operation controller at the monitoring station (111) or the automated computer program executed on the computer server (109) can then determine what appropriate actions need to be taken, which may include remote disablement of the commercial vehicle (103), communication with the law enforcement agency to intercept and stop the commercial vehicle (103), and apprehension of an illegitimate driver.

Continuing with FIG. 1, in a preferred embodiment of the invention, the monitoring station (111) may operate one or more computer programs executed on a CPU and a memory unit of a computer (e.g. 109), wherein the one or more computer programs are configured to receive, track, and analyze data transmitted from the fleet management system interface device (101) installed in the commercial vehicle (103). In this preferred embodiment of the invention, the fleet management system interface device (101) is capable of alerting the monitoring station (111) via a data network that a particular commercial vehicle driver is exhibiting dangerous or problematic behavior while operating the commercial vehicle (103). For example, the commercial driver may be exceeding a legal speed limit or showing an alarming sign of tiredness or problematic behaviors such as increasing gas pedal-associated vehicle lurches and/or deviations from lanes while driving the commercial vehicle (103). Furthermore, the commercial driver may also be making unexpected stops during a journey, or neglecting a mandatory rest after a long drive.

In one embodiment of the invention, the vehicle fleet management system interface device (101) integrates a GPS receiver (e.g. 405 of FIG. 4), which can be used to detect real-time speed changes, unexpected stops during a journey, or a mandatory rest after a long drive. Moreover, the vehicle fleet management system interface device (101) can also additionally incorporate a gyroscopic sensor, an accelerometer, and/or other sensors to detect the increasing gas pedal-associated vehicle lurches and/or lane deviations from a current lane. One or more hardware and/or software modules such as a speed/driving pattern analysis module (e.g. 517 of FIG. 5), an unexpected stop detection module (e.g. 519 of FIG. 5), a smart card validation module (e.g. 512 of FIG. 5), and a reporting module (e.g. 523) can be utilized in association with the GPS receiver (e.g. 405 of FIG. 4) and other sensors to enable driver's pattern analysis. In one embodiment of the invention, these types of driver's pattern analysis performed by the vehicle management system interface device (101) can be reported to the computer server (109) and the monitoring station (111) via a data network (e.g. 107) either in real time or periodically (e.g. hourly, daily, weekly, monthly, and etc.). In another embodiment of the invention, the driver's pattern analysis may be partially completed by the vehicle fleet management system interface device (101) while the rest of the driver's pattern analysis is completed by another hardware and/or software module operated by the computer server (109) either in real time or periodically. Yet in another embodiment of the invention, the driver's pattern analysis is nearly or entirely performed by the hardware and/or software module operated by the computer server (109) either in real time or periodically, with GPS receiver outputs and other sensor reading values being transmitted from the vehicle management system interface device (101) in the commercial vehicle (103) to the computer server (109) via a data network (e.g. 107).

Figure 2:
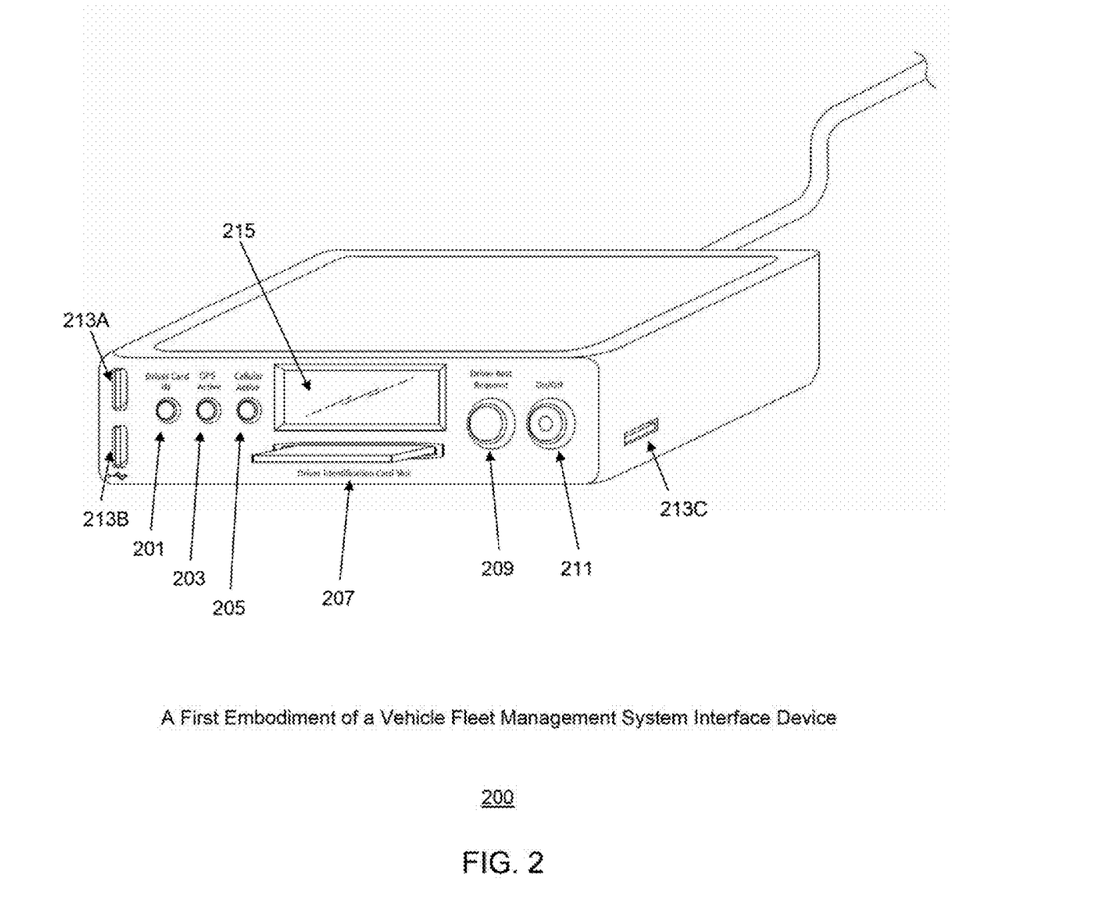
FIG. 2 shows a first embodiment of a vehicle fleet management system interface device in accordance with an embodiment of the invention.

FIG. 2 shows a first embodiment of a vehicle fleet management system interface device (200) in accordance with an embodiment of the invention. In this embodiment of the invention, the vehicle fleet management system interface device (200) is a set-top box with a display screen (215), a driver identification smart card slot (207), a power on/off button (211), and a plurality of indicator lights. Examples of indicator lights include, but are not limited to, a "driver card in" indicator light (201) which turns on if a driver identification smart card is inserted into the driver identification smart card slot (207), a "GPS active" indicator light (203) which turns on if a GPS signal is properly received by the vehicle fleet management system interface device (200), a "cellular active" indicator light (205) which turns on if a cellular data signal is property received by the vehicle fleet management system interface device (200), and a "driver rest required" light (209) which turns on if a driver has operated a commercial vehicle continuously without stopping for a mandatory rest typically required by law.

Furthermore, in one embodiment of the invention, the vehicle fleet management system interface device (200) can incorporate or connect to a keypad or a keyboard for a personal identification number (PIN) entry when a driver identification smart card is inserted into the driver identification card slot (207). If the entered PIN is valid, controls to the vehicle fleet management system interface device (200) and the commercial vehicle may be enabled. On the other hand, if the entered PIN is invalid for a few repeated attempts, the controls to the vehicle fleet management system and the commercial vehicle may be disabled and/or reported for security, accident prevention, and legal compliance.

Continuing with FIG. 2, in one embodiment of the invention, the display screen (215) can display functions and alerts associated with the vehicle fleet management system interface device (200). Furthermore, Universal Serial Bus (USB) ports and/or other input/output ports (213A, 213B, 213C) exposed on one or more exterior surfaces of the set-top box embodiment of the vehicle fleet management system interface device (200) can connect a variety of peripheral devices such as a memory card, a sensor, an external antenna, or other desirable electronic devices to the vehicle fleet management system interface device (200). Moreover, in one embodiment of the invention, the set-top box embodiment of the vehicle fleet management system interface device (200) is powered by a vehicle battery, an internal battery inside the vehicle fleet management system interface device (200), or another source of electrical power.

Figure 3:
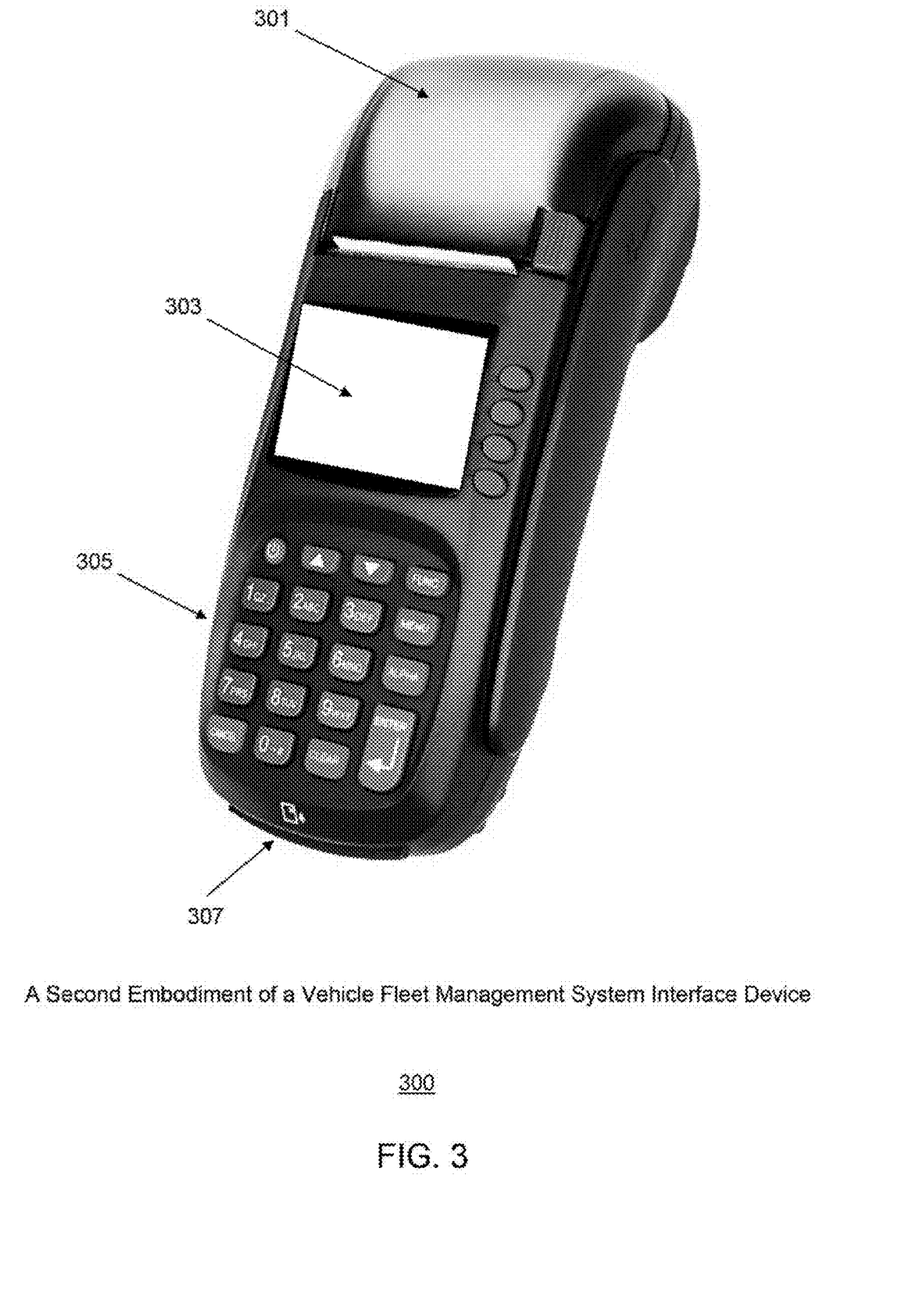
FIG. 3 shows a second embodiment of a vehicle fleet management system interface in accordance with an embodiment of the invention.

FIG. 3 shows a second embodiment of a vehicle fleet management system interface device (300) in accordance with an embodiment of the invention. In this embodiment of the invention, the vehicle fleet management system interface device (300) is a point-of-service (POS) device with an integrated keypad (305) for PIN entry, a smart card reader slot (307), a display screen (303), and a printer interface (301). The point-of-service device as illustrated in FIG. 3 can also integrate a GPS receiver, a wireless data transceiver (e.g. a cellular network transceiver), and other sensors for location tracking, driver pattern analysis, and wireless transmission of data to a computer server (e.g. 109 of FIG. 1) and a monitoring station (e.g. 111 of FIG. 1).

Furthermore, in one embodiment of the invention, the integrated keypad (305) on the point-of-service device can validate a personal identification number (PIN) entry when a driver identification smart card is inserted into the smart card reader slot (307). If the entered PIN is valid, controls to the vehicle fleet management system interface device (300) and the commercial vehicle may be enabled. On the other hand, if the entered PIN is invalid for a few repeated attempts, the controls to the vehicle fleet management system and the commercial vehicle may be disabled and/or reported to a monitoring station for security, accident prevention, and legal compliance.

Continuing with FIG. 3, in one embodiment of the invention, the display screen (303) can display functions and alerts associated with the point-of-service device utilized as a vehicle fleet management system interface device (300). In addition, the printer interface (301) may be also be integrated into the point-of-service device to print desirable information during operation of the vehicle fleet management system interface device (300). In one embodiment of the invention, the printer interface (301) may be utilized to print data and analysis stored in the point-of-service device for police inspections. For example, if a police officer inspects the commercial vehicle equipped with the vehicle fleet management system interface device (300) for a traffic law violation, a traffic law violation event number, vehicle speed-related data for a defined period (e.g. 5 hours), and other pertinent information can be printed on a piece of paper from the printer interface (301) of the point-of-service device embodiment of the vehicle fleet management system interface device (300). Furthermore, in another example, the printer interface (301) may also be utilized for printing any desirable data and analysis stored in the point-of-service device for a fleet management company's offline management of the commercial vehicle.

Furthermore, the point-of-service device may also have data input/output ports to connect a variety of peripheral devices such as a memory card, a sensor, an external antenna, or other desirable electronic devices. Moreover, in one embodiment of the invention, the point-of-service device embodiment of the vehicle fleet management system interface device (300) is powered by its internal battery, a vehicle battery, or another source of electrical power.

Figure 4:
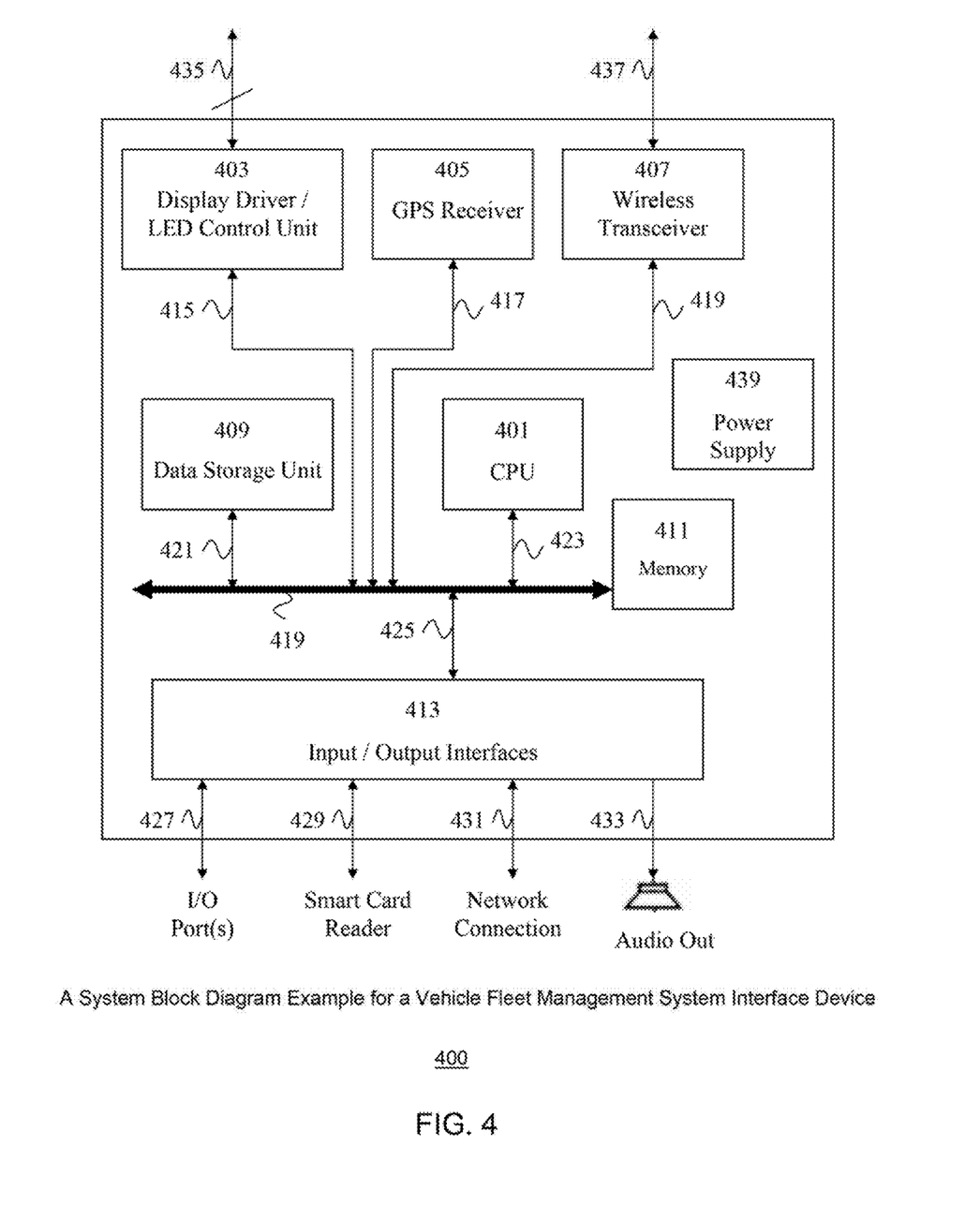
FIG. 4 shows an example of a system block diagram for a vehicle fleet management system interface, in accordance with an embodiment of the invention.

FIG. 4 shows an example of a system block diagram (400) for a vehicle fleet management system interface device, in accordance with an embodiment of the invention. In a preferred embodiment of the invention, the system block diagram (400) for the vehicle fleet management system interface device comprises a central processing unit (CPU) (401), a memory unit (411), a data storage unit (409), a display driver and light indicator control unit (403), a GPS receiver unit (405), and a wireless transceiver unit (407). In this preferred embodiment of the invention, the CPU (401) is operatively connected (i.e. 423) to other functional logic blocks (e.g. 403, 405, 407, 409, 411, 413, and etc.) via a data communication bus (419), and controls behaviors and actions of other functional logic blocks.

Furthermore, in the preferred embodiment of the invention, the memory unit (411) is a dynamic random access memory (DRAM) unit, a non-volatile memory unit such as a Flash memory unit, or a combination of both, wherein the memory unit (411) is configured to load data and instructions from the CPU (401) and the data storage unit (409). In addition, the data storage unit (409) is a hard disk drive, a non-volatile memory unit such as a Flash memory unit, or another data storage device operatively connected (i.e. 421) to other functional logic blocks via the data communication bus (419). In one embodiment of the invention, the data storage unit (409) is configured to store data and retain its stored data integrity even when the electrical power is no longer supplied to the vehicle fleet management system interface device.

Moreover, in the preferred embodiment of the invention with the system block diagram (400) for the vehicle fleet management system interface device as shown in FIG. 4, the display driver and light indicator control unit (403) is configured to drive a display screen (e.g. an LCD screen, one or more LED indicators, and etc.) operatively connected (i.e. 435) to the system block diagram (400). In general, driving the display screen involves providing and refreshing display-related data to the display screen. The display driver and light indicator control unit (403) is operatively connected (i.e. 415) to the data communication bus (419), and this unit's actions and behaviors can be ultimately controlled by the CPU (401).

Continuing with FIG. 4, in the preferred embodiment of the invention, the GPS receiver (405) is configured to receive GPS location signals and at least partially demodulate or process the received GPS location signals for use by other functional logic blocks in the system block diagram (400). Any GPS location information derived from the received GPS location signals may be used for location tracking, driving pattern analysis, unexpected stop detections, and other features incorporated in the vehicle fleet management system interface device. In one embodiment of the invention, the GPS receiver (405) is operatively connected (i.e. 417) to the CPU (401) via the data communication bus (419).

Furthermore, in the preferred embodiment of the invention, a wireless transceiver (407) is configured to transmit wireless signals to a wireless router and/or a base station. The wireless transceiver (407) is also configured to receive wireless signals from the wireless router and/or the base station. The wireless transceiver (407) is operatively connected (i.e. 419) to the CPU (401) via the data communication bus (419), wherein the CPU (401) controls and instructs the wireless transceiver (407) for transmission and reception of wireless signals. In one embodiment of the invention, the wireless transceiver (407) may also utilize a separate digital signal processing (DSP) unit which processes data packets for wireless transmission or reception according to a particular wireless protocol. In the preferred embodiment of the invention, the wireless transceiver (407) is designed for cellular network data transmission and reception. In another embodiment of the invention, the wireless transceiver (407) may also be designed for wireless local area networks (wireless LAN's), mobile broadband signals (e.g. WiMAX), personal area networks (e.g. NFC, Bluetooth), cellular signals, or a combination thereof. In the preferred embodiment of the invention, the wireless transceiver (407) is operatively connected to an RF antenna via an electrical connection (i.e. 437).

Moreover, in the preferred embodiment of the invention, the system block diagram (400) for a vehicle fleet management system interface device also includes input/output (I/O) interfaces (413), which is operatively connected (i.e. 425) to the CPU (401) and other functional logic blocks of the system block diagram (400) via the data communication bus (419). In one embodiment of the invention, the I/O interfaces (413) provide data, power, and/or other connections (i.e. 427, 429, 431, 433) to an I/O port (427), a smart card reader (429), a network connection interface (431), and an audio output port (433). Furthermore, a power supply unit (439) is operatively connected to the CPU (401) and other functional logic blocks of the system block diagram (400) for a vehicle fleet management system interface device, wherein the power supply unit (439) receives electrical power from a battery or another electrical power source, and provides electrical power to the CPU (401) and other functional logic blocks in the vehicle fleet management system interface device.

Figure 5:
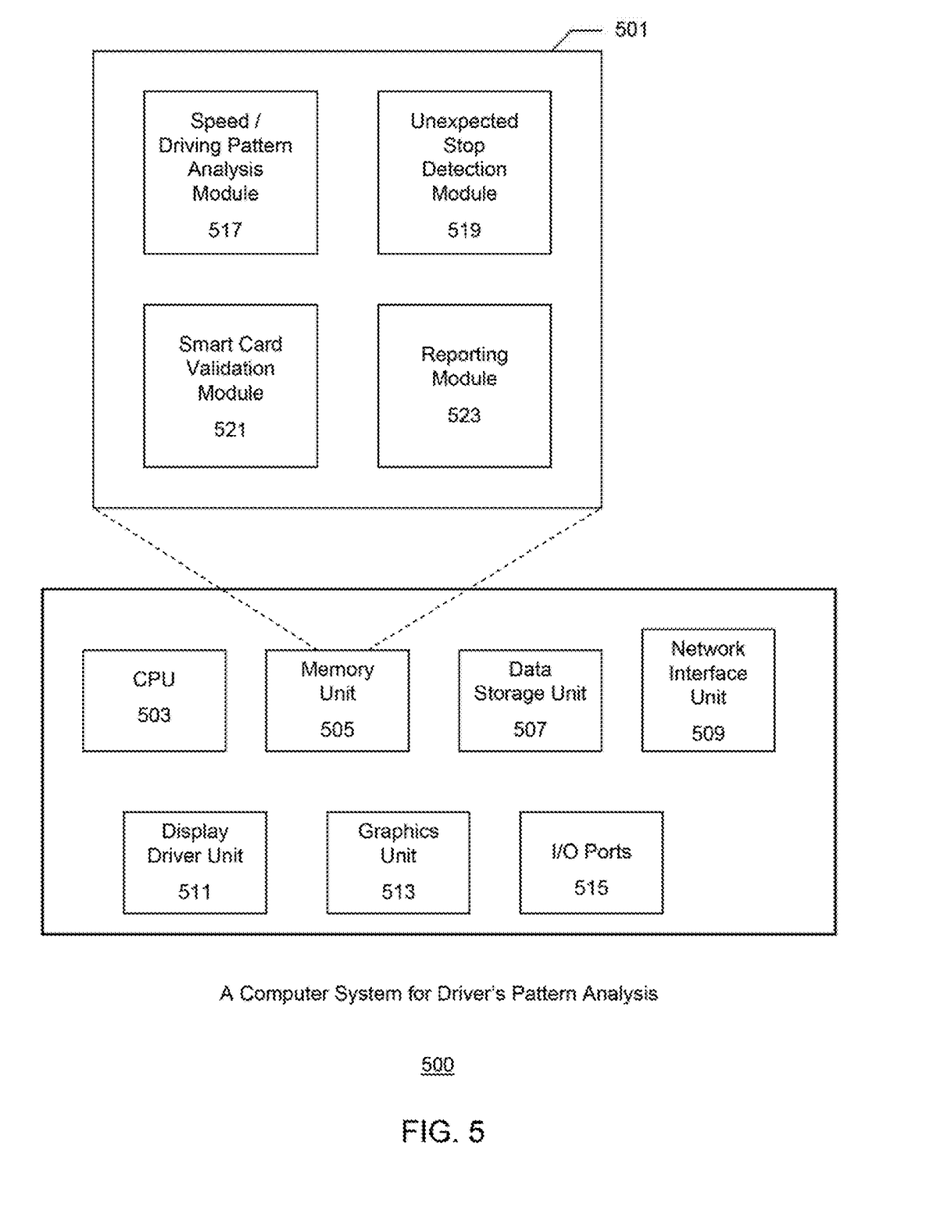
FIG. 5 shows a computer system executing a variety of driver's driving pattern analysis on a CPU and a memory unit of the computer system, in accordance with an embodiment of the invention.

FIG. 5 shows a computer system (500) executing a variety of driver's driving pattern analysis on a CPU (503) and a memory unit (505) of the computer system (500), in accordance with an embodiment of the invention. In a preferred embodiment of the invention, the computer system (500) comprises the CPU (503), the memory unit (505), a data storage unit (507), a network interface unit (509), a display driver unit (511), a graphics unit (513), and an I/O ports unit (515). In the preferred embodiment of the invention, this computer system (500) is either part of a vehicle fleet management system interface device (e.g. 101 of FIG. 1) or a computer server (e.g. 109 of FIG. 1) which is operatively connected to a monitoring station (e.g. 111 of FIG. 1).

In the preferred embodiment of the invention, an analytical software module (501) comprising a speed and driving pattern analysis module (517), an unexpected stop detection module (519), a smart card validation module (521), and a reporting module (523) is loaded to the memory unit (505) and executed on the CPU (503), as shown in FIG. 5. In one embodiment of the invention, the analytical software module (501) may be stored in the data storage unit (507) and dynamically loaded to the memory unit (505) when desired. In another embodiment of the invention, the analytical software module (501) may be at least partially transmitted via a data network and loaded to the memory unit (505) for execution by the CPU (503). Yet in another embodiment of the invention, the analytical software module (501) may exist as multiple discrete modules, which are executed by a multiple number of computer systems.

Continuing with FIG. 5, in the preferred embodiment of the invention, the speed and driving pattern analysis module (517) is capable of detecting, analyzing, and determining that a particular commercial vehicle driver is exhibiting dangerous or problematic behavior while operating a commercial vehicle. For example, using various sensor reading values and input values available to the analytical software module (501), the speed and driving pattern analysis module (517) can determine whether the commercial driver exceeds a legal speed limit or shows an alarming sign of tiredness or problematic behaviors such as increasing gas pedal-associated vehicle lurches and/or deviations from lanes while driving the commercial vehicle. This speed and driving pattern analysis may be performed in real-time or periodically (e.g. hourly, daily, weekly, monthly, and etc.), and any associated alerts can be forwarded to a monitoring station. A human operation controller or an automated computer program at the monitoring station can then determine what actions to take regarding the commercial driver. Examples of some actions to take include, but are not limited to, contacting the commercial driver by telephone, informing law enforcement agencies to intercept the commercial vehicle, subsequent criminal prosecution of the commercial driver, and revoking the commercial driver's right to drive the commercial vehicle if the offenses are repeated beyond acceptable levels.

Furthermore, the unexpected stop detection module (519) can take GPS receiver reading values and any other desirable sensor readings to determine whether the commercial driver is making unexpected stops during a journey, or neglecting a mandatory rest after a long drive. For example, the commercial driver not taking a break after many hours of continuous driving can be determined by checking whether GPS coordinates of a commercial vehicle has not been stationary for a set amount of time (e.g. 30 minutes, 1 hour, and etc.), when the interval between the last known stoppage of the commercial vehicle and the current time has exceeded a mandatory time limit for continuous driving. If the commercial vehicle has not been stationary for the set amount of time even though the interval between the last known stoppage of the commercial vehicle and the current time has exceeded the mandatory time limit for continuous driving, the unexpected stop detection module (519) may correctly determine that the commercial driver has ignored the mandatory rest requirement, and report the incident accordingly to the monitoring station in real time or periodically. A human operation controller or an automated computer program at the monitoring station can then determine what actions to take regarding the commercial driver, wherein the actions may include contacting the commercial driver by telephone, subsequent criminal prosecution of the commercial driver, interception of the commercial vehicle, and/or remote disablement of the commercial vehicle.

Continuing with FIG. 5, in the preferred embodiment of the invention, the smart card validation module (521) is capable of validating a commercial driver's smart card and an associated PIN entry. In one embodiment of the invention, the smart card validation module (521) may be also configured to change PIN's for the commercial driver's smart card, if a PIN change is requested by a user. Furthermore, in one embodiment of the invention, the smart card validation module may also track the presence of a smart card continuously or periodically inserted in a driver card identification slot (e.g. 207 of FIG. 2) or another smart card reader slot (e.g. 307 of FIG. 3). If the smart card is not inserted in the driver card identification slot or another smart card reader slot continuously or periodically (e.g. every three hours, every day, and etc.), then the vehicle fleet management system interface device may prompt the commercial driver to validate or re-validate the commercial driver's smart card. If the commercial driver fails to validate or re-validate the commercial driver's smart card within a set amount of time despite alerting the commercial driver to do so, then the vehicle fleet management system interface device may transmit a warning to the monitoring station to indicate that the commercial driver is not validating or re-validating his or her driver's smart card.

In addition, the reporting module (523) is capable of transmitting driver-related and vehicle-related information to the monitoring station in real time or periodically (e.g. hourly, daily, weekly, monthly). Examples of driver-related and vehicle-related information include, but are not limited to, speed and driver pattern analysis information, unexpected stop information, smart card validation and re-validation information, and alerts associated with the commercial driver or the commercial vehicle equipped with the vehicle fleet management system interface device. In one embodiment of the invention, a formalized report may be generated by the reporting module on a periodic basis (e.g. hourly, daily, weekly, monthly, and etc.) for the monitoring station, while a dynamic alert may be generated if a particular alert requires immediate attention from the monitoring station. A formalized report, in one example, may contain a history of a commercial driver's driving patterns, unexpected stops, smart card validations, and other helpful information for authorities to determine whether the commercial driver behaved appropriately or not during the operation of a commercial vehicle.

Figure 6:
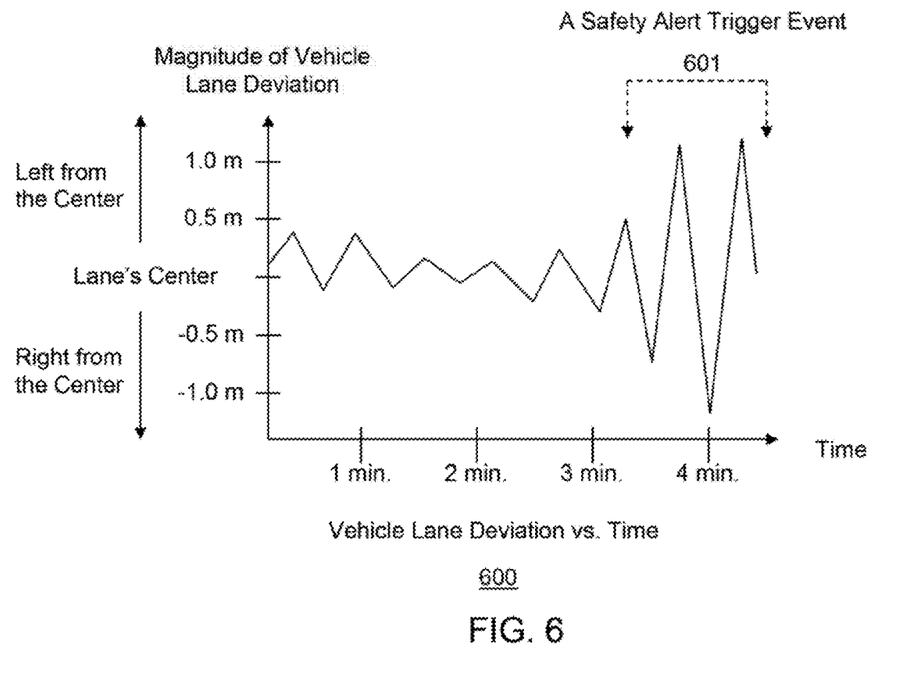
FIG. 6 shows an example of a driving pattern analysis comparing a vehicle's lane deviation relative to time, in accordance with an embodiment of the invention.

FIG. 6 shows an example of a driving pattern analysis (600) comparing a vehicle's lane deviation relative to time, in accordance with an embodiment of the invention. In this embodiment of the invention, the vehicle's lane deviation is measured in meters (i.e. represented in the vertical axis) from a center of a lane and is plotted against time (i.e. represented in the horizontal axis). For the first three minutes in this example of the driving pattern analysis (600), the lane deviation is less than 0.5 meters, and the peak-to-peak amplitude (i.e. the distance from a top peak, or "crest," to a bottom peak, or "trough," in lane deviation value) of the lane deviation relative to the lane's center is small. However, after three minutes, the lane deviation value and the peak-to-peak amplitude of the lane deviation relative to the lane's center increase significantly, thereby triggering a safety alert trigger event (601). In this embodiment of the invention, when the safety alert trigger event occurs, an analytical software module (e.g. 501 of FIG. 5, 517 of FIG. 5, and etc.) records the incident and transmits pertinent information as an alert to a monitoring station. The analytical software module may be operated by a vehicle fleet management system interface device, a computer system server operatively connected to the vehicle fleet management system interface device, or a combination thereof.

Figure 7:
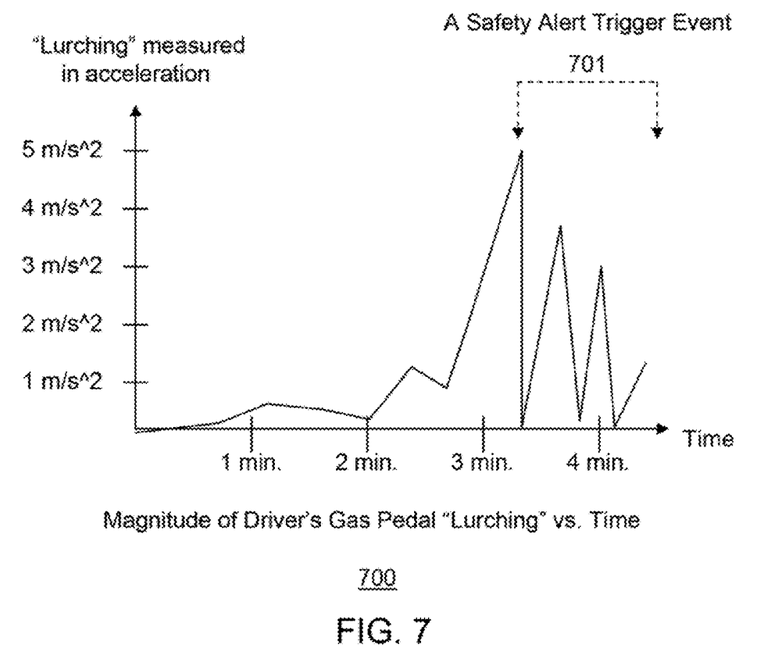
FIG. 7 shows an example of a driving pattern analysis comparing a driver's gas pedal-associated vehicle lurching relative to time, in accordance with an embodiment of the invention.

FIG. 7 shows an example of a driving pattern analysis (700) comparing a driver's gas pedal-associated vehicle lurching relative to time, in accordance with an embodiment of the invention. In this embodiment of the invention, the driver's gas pedal-associated vehicle lurching is measured as accelerations in meters per second-squared (i.e. represented in the vertical axis), and is plotted against time (i.e. represented in the horizontal axis). For the first two-and-half minutes in this example of the driving pattern analysis (700), acceleration values are less than 2 meter per second-squared, and the peak-to-peak amplitude (i.e. the distance from a top peak, or "crest," to a bottom peak, or "trough") in acceleration changes relative to time is small. However, after two-and-half minutes, the gas pedal-associated vehicle lurching measured in acceleration changes and the peak-to-peak amplitudes for acceleration changes increase significantly, thereby triggering a safety alert trigger event (701). In this embodiment of the invention, when the safety alert trigger event occurs, an analytical software module (e.g. 501 of FIG. 5, 517 of FIG. 5, and etc.) records the incident and transmits pertinent information as an alert to a monitoring station. The analytical software module may be operated by a vehicle fleet management system interface device, a computer system server operatively connected to the vehicle fleet management system interface device, or a combination thereof.

Figure 8:
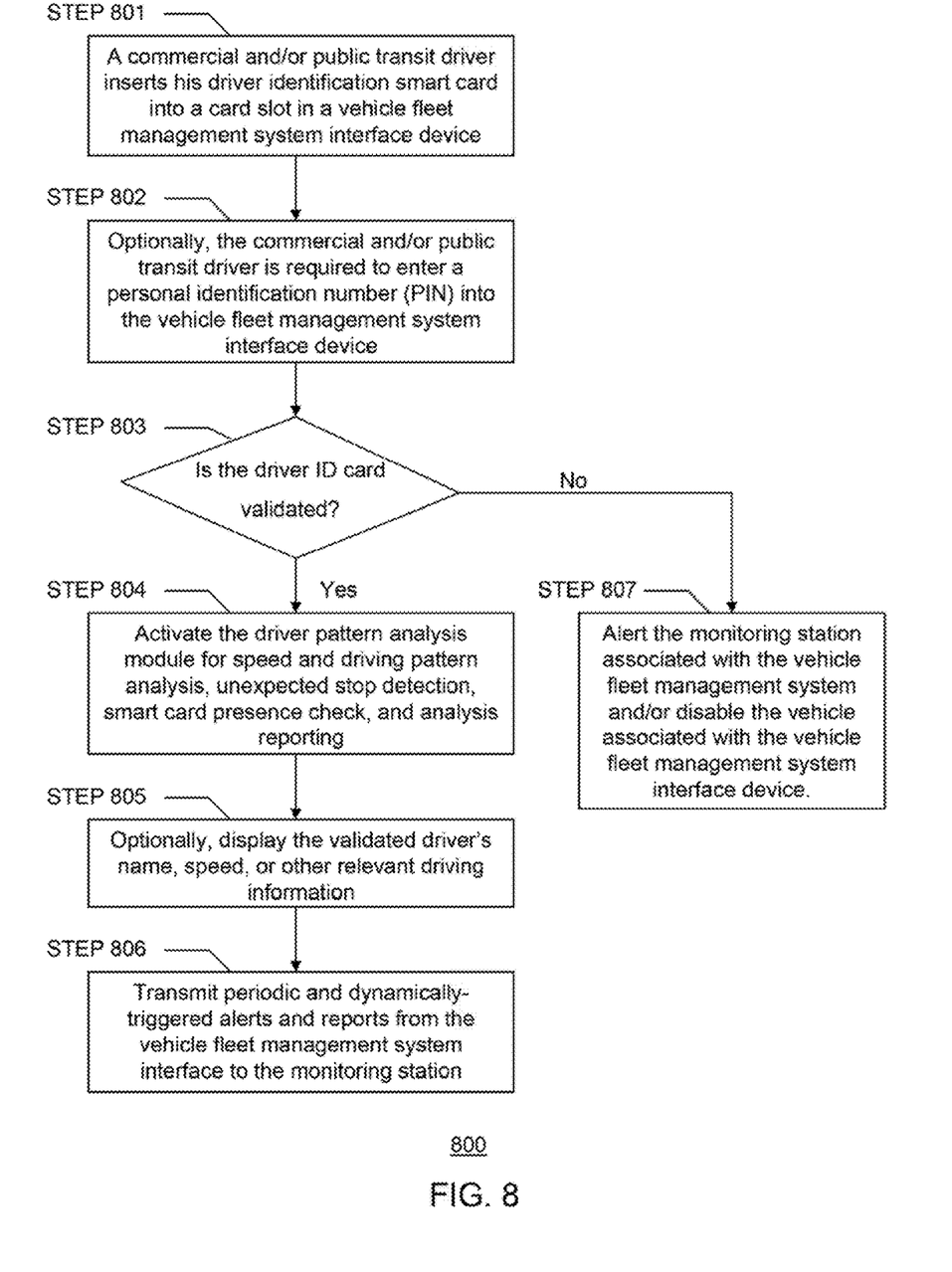
FIG. 8 shows a method for operating an intelligent fleet management system in accordance with an embodiment of the invention.

FIG. 8 shows a method (800) for operating an intelligent fleet management system in accordance with an embodiment of the invention. In this embodiment of the invention, a commercial and/or public transit driver inserts his driver identification card (e.g. a smart card or another electronic form of identification) into a card slot or utilizes another electronic information reader in a vehicle fleet management system interface device, as shown in STEP 801. If an operator of the intelligent fleet management system desires a personal identification number (PIN)-based validation of the driver identification card, then the commercial and/or public transit driver is required to enter a correct PIN into the vehicle fleet management system interface device, as shown in STEP 802.

If the driver identification card is not validated for a few times, as shown in STEP 803, then the intelligent fleet management system may disable a commercial vehicle associated with the vehicle fleet management system interface device and/or alert a monitoring station for a potential security breach, as shown in STEP 807. On the other hand, if the driver identification card is validated, as also shown in STEP 803, then the intelligent fleet management system can activate the driver pattern analysis module for speed and driving pattern analysis, unexpected stop detection, smart card presence check, and analysis reporting, as shown in STEP 804. Furthermore, the vehicle fleet management system interface device may display the validated driver's name, speed, or other relevant information via a display screen for passengers to see the displayed information, as shown in STEP 805. In addition, the vehicle fleet management system interface device may transmit periodic and/or dynamically-triggered alerts and reports from an analytical software and/or hardware module (e.g. 501 of FIG. 5) to a monitoring station, as shown in STEP 806.

Various embodiments of the present invention provide several key advantages to commercial transportation and public transit industries. An embodiment of the present invention provides an intelligent fleet management system that securely validates a commercial driver's identification with an identification information reader incorporated in a vehicle fleet management system interface device for a commercial vehicle in one embodiment of the invention. With electronic real-time validation of the commercial driver's identification in commercial vehicles, the commercial transportation and public transit industries can achieve a higher level of public road safety and legal compliance, while reducing liability risk and strengthening a criminal prosecution case against an illegitimate driver by requiring a driver-specific PIN entry.

Furthermore, by providing an intelligent fleet management system that includes a monitoring station for commercial vehicles and a vehicle fleet management system interface device per vehicle, an embodiment of the present invention can track and analyze data transmitted from each vehicle fleet management system interface device installed per commercial vehicle periodically or in real time for a coherent commercial vehicle fleet safety and legal compliance monitoring.

In addition, by also providing an intelligent fleet management system that alerts a monitoring station when a particular commercial driver is exhibiting one or more dangerous or problematic behaviors, such as exceeding a speed limit, increasing gas pedal-associated vehicle lurches, increasing lane deviations, making unexpected stops during a journey, and not taking a mandatory rest after a long drive, an embodiment of the present invention can improve public road safety and passenger safety for commercial vehicles.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. An intelligent fleet management system for a commercial vehicle, the intelligent fleet management system comprising:
    a vehicle fleet management system interface device configured to validate an electronic form of a driver's identification by accessing the electronic form and also requiring a driver-specific personal identification number (PIN) entry into the vehicle fleet management system interface;
    an analytical software and/or hardware module at least partially executed on a CPU and a memory unit of the vehicle fleet management system interface device, wherein the analytical software and/or hardware module comprises a speed and driving pattern analysis module, an unexpected stop detection module, a driver's identification validation module, and a reporting module;
    a wireless transceiver unit and a global positioning system (GPS) receiver unit incorporated in the vehicle fleet management system interface device, wherein the wireless transceiver unit is configured to communicate data from the driver's identification validation module, the speed and driving pattern analysis module, the unexpected stop detection module, and/or other relevant data with a monitoring station; and
    the monitoring station configured to communicate with the vehicle fleet management system interface device via a wireless and/or wired data network.

2. The intelligent fleet management system of claim 1, further comprising a computer server operatively connected to the monitoring station, wherein the computer server is configured to execute at least a portion of the analytical software and/or hardware module and other programs on a server CPU and a server memory unit for generating periodic or dynamic alerts and reports to the monitoring station.

3. The intelligent fleet management system of claim 1, further comprising a satellite communication network which is part of the wireless and/or wired data network.

4. The intelligent fleet management system of claim 1, further comprising a keypad or a keyboard configured to take the driver-specific personal identification number (PIN) as an input for validating the electronic form of the driver's identification.

5. The intelligent fleet management system of claim 1, further comprising a driver identification card slot or another electronic identification information reader.

6. The intelligent fleet management system of claim 1, wherein the wireless and/or wired data network involves a cellular network, and wherein the wireless transceiver unit is a cellular network protocol-compliant wireless transceiver.

7. The intelligent fleet management system of claim 1, wherein the electronic form of the driver's identification is a smart card configured to be accessed by the vehicle fleet management system interface device with a driver identification card slot.

8. The intelligent fleet management system of claim 1, wherein the vehicle fleet management system interface device is a set-top box with a display screen, one or more light indicators, and input/output ports.

9. The intelligent fleet management system of claim 1, wherein the vehicle fleet management system interface device is a point-of-service (POS) device with a display screen and a printer interface.

10. The intelligent fleet management system of claim 1, further comprising a display screen for passengers, wherein the display screen shows a validated driver's name, a current speed of the commercial vehicle, and/or other relevant driving information for the passengers in the commercial vehicle.

11. The intelligent fleet management system of claim 1, wherein the speed and driving pattern analysis module uses the GPS receiver unit, an accelerometer, and/or another sensor to determine a magnitude of vehicle lane deviation from a lane's center, and also to determine the commercial vehicle's gas pedal-associated vehicle lurching measured in acceleration.

12. The intelligent fleet management system of claim 11, wherein the speed and driving pattern analysis module triggers a safety alert trigger event, which is transmitted to the monitoring station, if the commercial vehicle deviates excessively from the lane's center over a first set amount time, or if the commercial vehicle lurches excessively over a second set amount of time.

13. The intelligent fleet management system of claim 1, further comprising a display screen for passengers, wherein the display screen shows a validated driver's name and at least some speed and driving pattern analysis information from the analytical software and/or hardware module.

14. A method of operating an intelligent fleet management system, the method comprising steps of:
inserting or enabling a driver's electronic identification to be accessed by a vehicle fleet management system interface device in a commercial vehicle;
entering a correct personal identification number (PIN) into the vehicle fleet management system interface device using a keyboard, a keypad, or a touch screen;
if the driver's electronic identification is validated:
activating a driver pattern analysis module for speed and driving pattern analysis, unexpected stop detection, the driver's electronic identification presence check, and analysis reporting for a monitoring station;
displaying a validated driver's name, a current speed of the commercial vehicle, and other relevant driving information; and
transmitting periodic and dynamically-triggered alerts and reports from the vehicle fleet management system interface to the monitoring station;
else if the driver's electronic identification is not validated:
alerting the monitoring station for the vehicle fleet management system and/or disabling the commercial vehicle associated with the vehicle fleet management system interface device.

15. The method of claim 14, wherein the driver pattern analysis module comprises a speed and driving pattern analysis module, an unexpected stop detection module, an electronic identification validation module, and a reporting module.

16. The method of claim 15, wherein the speed and driving pattern analysis module uses a GPS receiver unit, an accelerometer, and/or another sensor to determine a magnitude of vehicle lane deviation from a lane's center, and also to determine the commercial vehicle's lurching measured in acceleration.

17. The intelligent fleet management system of claim 16, wherein the speed and driving pattern analysis module triggers a safety alert trigger event, which is transmitted to the monitoring station, if the commercial vehicle deviates excessively from the lane's center over a first set amount time, or if the commercial vehicle lurches excessively over a second set amount of time.

* * * * *